(12) United States Patent
Lee et al.

(10) Patent No.: US 9,946,880 B2
(45) Date of Patent: Apr. 17, 2018

(54) SOFTWARE VULNERABILITY ANALYSIS METHOD AND DEVICE

(71) Applicant: Korea University Research and Business Foundation, Seoul (KR)

(72) Inventors: Heejo Lee, Seoul (KR); Hongzhe Li, Seoul (KR); Jonghoon Kwon, Seoul (KR); Hyuck-Min Kwon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 95 days.

(21) Appl. No.: 14/978,300

(22) Filed: Dec. 22, 2015

(65) Prior Publication Data

US 2016/0188885 A1 Jun. 30, 2016

(30) Foreign Application Priority Data

Dec. 26, 2014 (KR) .......................... 10-2014-0190954

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................................................. G06F 21/577
See application file for complete search history.

(56) References Cited

U.S. PATENT DOCUMENTS

| 2012/0159434 | A1* | 6/2012 | Dang ................ | G06F 8/751 717/120 |
| 2012/0317647 | A1* | 12/2012 | Brumley ............ | G06F 21/00 726/25 |
| 2013/0179863 | A1* | 7/2013 | Vangala ............ | G06F 8/74 717/124 |

FOREIGN PATENT DOCUMENTS

WO 2012079230 A1 6/2012

OTHER PUBLICATIONS

ReDeBug: Finding Unpatched Code Clones in Entire OS Distributions. Jiyong Jang, Maverick Woo, and David Brumley, USENIX; login: Magazine. Dec. 2012.*
Li et al., "A Scalable Approach for Vulnerability Discovery based on Security Patches," Applications and Techniques in Information Security, 5th International Conference (ATIS 2014): pp. 109-120.

* cited by examiner

*Primary Examiner* — Carl Colin
*Assistant Examiner* — Vance Little
(74) *Attorney, Agent, or Firm* — Fox Rothschild LLP

(57) ABSTRACT

The present disclosure includes: searching a code clone corresponding to a used source code from any analysis target source code; detecting a security sink and sensitive data of the security sink on the basis of patch information in the searched code clone; acquiring a source code which is from the user input point the a security sink by backwardly tracing the sensitive data detected in the analysis target source code; and verifying whether the searched code clone is a vulnerability in the analysis target source code by performing a concolic testing on the basis of a path from the input point to the security sink.

10 Claims, 11 Drawing Sheets

```
1   void function(char* str1, int a)
2   {
3       str1 = readfile();
4       str2 = readnetwork();

5       if(a != 0)
6       {
7           Src = str1;
8           src2 = str2;
9       }

10      else
11      {
12          src3 = str1;
13          src4= str2;
14      }

15      strcpy(dest, src);
16  }
```

```
Backward_Variable_Tracing(V, G){
            Ancestor = BackwardFindAncesotr(V,G);
            if(Ancestor IS NOT ROOT){
                next_tracing_V = FindNextTracingVariable(Ancestor);
                Backward_Variable_Tracing(next_tracing_V);
            }
            else{
                        Output(ROOT);
            }
}
BackwardFindAncestor(V,G){
    currentNode = getCurrentNode(V);
    while(1) {
        nextNode = BackwardTraverseCodeStructureGraph(currentNode,G);
        statement_case = CaseAnalyze(nextNode);
        switch(statement_case){
                    case 1:  return nextNode;
                    case 2:  return nextNode;
                    case 3:  return nextNode;
                    case 4:  return nextNode;
                    Default:
        }
        currentNode = nextNode;
    }
}
```

*FIG. 8*

| SECURITY-SENSITIVE FUNCTION | SECURITY REQUIREMENT |
|---|---|
| strcpy(dst,src) | dst.space > src.strlen |
| strncpy(dst,src,n) | (dst.space $\geq$ n) $\wedge$ (n $\geq$ 0) |
| strcat(dst,src) | dst.space > dst.strln + src.strlen |
| printf(format, ...) | # formats = # parameters-1 |

FIG. 10A

| Target | CVE patches | Target src pool | # of files | # of reported code clones | Execution time |
|---|---|---|---|---|---|
| Src pool-1 | CVE patch pool (2010-2014, for C code) | Ubuntu 14.04 OS distribution | 259346 | 63 | 24812.5 sec (7 hours) |
| Src pool-2 | CVE patch pool (2010-2014, for C code) | Httpd-2.2.23 to 2.4.6 | 7820 | 14 | 738.6 sec (12.31 min) |
| Src pool-3 | CVE patch pool (2010-2014, for C code) | Rsyslog-5.8.13 to 8.2.1 | 1692 | 7 | 274.7 sec (4.57 min) |

FIG. 10B

| program | CVE patch | Location of the vulnerability |
|---|---|---|
| Cmake-2.8.12.2 | CVE-2010-0405.patch | /Utilities/cmbzip2/decompress.c:381 |
| Firefox-28.0+build2 | CVE-2010-0405.patch | /modules/libbz2/src/decompress.c:381 |
| Thunderbird-24.4.0+build1 | CVE-2010-0405.patch | /plugins/pmrfc3164sd/pmrfc3164sd.c:381 |
| rsyslog-7.4.4 | CVE-2011-3200.patch | /plugins/pmrfc3164sd/pmrfc3164sd.c:272 |
| gegl-0.2.0 | CVE-2012-4433.patch | /operations/external/ppm-load.c:87 |
| linux-3.13(Linux kernel) | CVE-2014-2581.patch | /net/ipv4/ping.c:250 |
| httpd-2.4.7(Apache) | CVE-2011-3368.patch | /server/protocol.c:625 |

FIG. 10C

| Version | # LOC | # of reported code clones | # of vulnerability found/verified | # of false positives |
|---|---|---|---|---|
| Httpd-2.2.23 | 350145 | 1 | 1 | 0 |
| Httpd-2.2.24 | 350256 | 1 | 1 | 0 |
| Httpd-2.3.6 | 209369 | 1 | 1 | 0 |
| Httpd-2.3.8 | 210564 | 1 | 1 | 0 |
| Httpd-2.3.11-beta | 219427 | 1 | 1 | 0 |
| Httpd-2.3.15-beta | 226497 | 0 | 0 | 0 |
| Httpd-2.4.1 | 223050 | 1 | 1 | 0 |
| Httpd-2.4.2 | 223265 | 1 | 1 | 0 |
| Httpd-2.4.3 | 223921 | 1 | 1 | 0 |
| Httpd-2.4.4 | 226000 | 1 | 1 | 0 |
| Httpd-2.4.6 | 233330 | 1 | 1 | 0 |

FIG. 10D

| Version | # LOC | # of reported code clones | # of vulnerability found/verified | # of false positives |
|---|---|---|---|---|
| Rsyslog-5.8.13 | 78937 | 1 | 1 | 0 |
| Rsyslog-5.10.0 | 78259 | 1 | 1 | 0 |
| Rsyslog-5.10.1 | 77811 | 1 | 1 | 0 |
| Rsyslog-6.6.0 | 92448 | 1 | 1 | 0 |
| Rsyslog-7.4.0 | 105324 | 1 | 1 | 0 |
| Rsyslog-7.6.3 | 111218 | 1 | 1 | 0 |
| Rsyslog-8.2.1 | 112711 | 1 | 1 | 0 |

SOFTWARE VULNERABILITY ANALYSIS METHOD AND DEVICE

CROSS-REFERENCE TO RELATED APPLICATION

This application claims the benefit under 35 USC 119(a) of Korean Patent Application No. 10-2014-0190954 filed on Dec. 26, 2014, in the Korean Intellectual Property Office, the entire disclosures of which are incorporated herein by reference for all purposes.

BACKGROUND

Technical Field

The present disclosure relates to a software vulnerability analysis method and device.

Description of Related Art

According to a Symantec Internet Security Threat Report 2014, software vulnerability attacks are increasing every year. Particularly, 23 zero-day software vulnerabilities unknown before were newly discovered in 2013, which means a 61% increase over 2012. In Korea, attacks using software vulnerabilities are increasing day after day, and various attacks such as malicious code infections, DDoS attacks, personal information leakages, and the like have been reported.

Currently, in order to analyze and respond to software vulnerabilities, testing methods such as symbolic testing and fuzzy testing have been used. However, the conventional methods such as symbolic testing and fuzzy testing show poor performance in terms of analysis time and accuracy. Further, in order to use these methods, human resources with high level expertise and ample prior knowledge and practical experience are needed. Therefore, accessibility of these methods for analyzing software vulnerabilities is low.

Accordingly, under the current circumstances that a lot of new software is developed every day along with the growth of IT industry, a study on a method for increasing efficiency and accuracy in software vulnerability analysis and reducing time and resources required for the analysis is essential.

Meanwhile, Korean Patent Laid-open Publication No. 10-2014-0001951 (entitled "Intelligent code differencing using code clone detection) discloses systems and methods for intelligent code differencing employing code clone detection technology.

SUMMARY

The present disclosure provides a software vulnerability analysis method and device for analyzing software vulnerabilities after detecting a code clone. Notably, problems to be solved by the present disclosure are not limited to the above-described problems. There may be other problems to be solved by the present disclosure.

In some scenarios, the software vulnerability analysis method includes: searching a code clone corresponding to a used source code from any analysis target source code; detecting a security sink and sensitive data of the security sink on the basis of patch information in the searched code clone; acquiring a source code which is from the user input point to the security sink by backwardly tracing the sensitive data detected in the analysis target source code; and verifying whether the searched code clone is a vulnerability in the analysis target source code by performing a concolic testing on the basis of a path from the input point to the security sink.

In those or other scenarios, the software vulnerability analysis device includes: a memory in which a program for conducting vulnerability analysis on any analysis target source code is stored; and a processor configured to execute the program. Herein, when the program is executed, the processor searches a code clone corresponding to a used source code from the analysis target source code, detects a security sink and sensitive data of the security sink on the basis of patch information in the searched code clone, acquires a source code which is from the user input point to the security sink by backwardly tracing the sensitive data detected in the analysis target source code, and verifies whether the searched code clone is a vulnerability in the analysis target source code by performing a concolic testing on the basis of a path from the input point to the security sink.

According to any one of the above-described exemplary scenarios, a code clone corresponding to a used source code is searched from a large-scale analysis target source codes and the searched code clone is used for vulnerability analysis. Thus, it is possible to increase efficiency and rapidity in analyzing vulnerabilities of the large-scale target source code.

Further, according to the present disclosure, in order to acquire a source code corresponding to an input point which can be used by an attack, a backward tracing of a program path is performed on the basis of a security sink and sensitive data by using a code structure graph. Thus, it is possible to increase efficiency and accuracy in acquiring the source code which is from the input point to the security sink corresponding to the input point.

Furthermore, according to the present disclosure, a concolic testing is performed to the acquired input point which is from the user input point to the security sink to verify whether there is a vulnerability on the basis of security requirements. Thus, it is possible to determine whether the acquired source code is actually exploitable in an attack with high reliability. Therefore, as compared with the conventional static analysis methods, the present disclosure can reduce false positives. Further, the present disclosure can remove the restriction that the conventional concolic testing methods can be applied only to small-scale codes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6A and FIG. 6B are diagrams provided to describe a code structure graph.

FIG. 7A and FIG. 7B are diagrams provided to describe an execution process of the code structure graph illustrated in FIG. 6B.

FIG. 8 is a diagram provided to describe security requirements for generating a testing program.

FIGS. 10A, 10B, 10C and 10D are diagrams provided to describe a result of vulnerability analysis depend on the software vulnerability analysis method proposed in the present disclosure.

DETAILED DESCRIPTION

Figure 1:
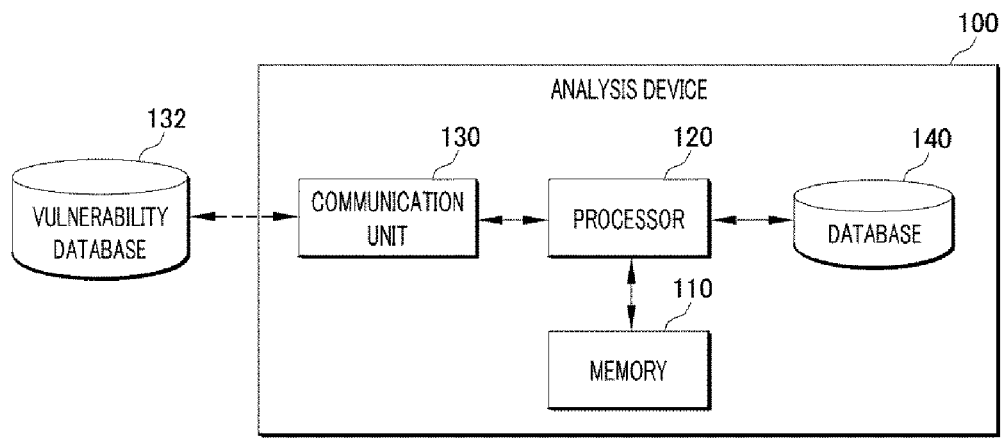
FIG. 1 is a configuration view of a software vulnerability analysis device.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

The following exemplary embodiments are provided only for understanding of the present disclosure but not intended to limit the right scope of the present disclosure. Therefore, the inventions that perform the same functions in the same scope as the present disclosure are also included in the right scope of the present invention.

A general software vulnerability analysis method is performed with respect to an overall flow of an analysis target source code. However, if the analysis target source code is large-scale software, it is difficult to understand the overall flow and there are a great number of cases for the analysis. Thus, it takes time and it is necessary to secure human resources with expertise.

However, a software vulnerability analysis method and device according to the present disclosure is a practical vulnerability analysis technique of priorly searching a portion (for example, a code clone) where vulnerabilities are actually highly likely to be generated rather than covering every portion of large-scale analysis target source codes and analyzing the searched portion by using vulnerability information previously disclosed.

Hereinafter, the software vulnerability analysis technique proposed in the present disclosure will be described in detail with reference to the accompanying drawings.

FIG. 1 is a configuration view of a software vulnerability analysis device 100. The software vulnerability analysis device 100 may include a memory 110, a processor 120, a communication unit 130, a vulnerability database 132, a database 140, and a display device 150. However, the software vulnerability analysis device 100 illustrated in FIG. 1 is just an exemplary configuration of the present disclosure, and does not limit the present disclosure. That is the software vulnerability analysis device 100 may further include a user interface and thus may have a different configuration from that shown in FIG. 1.

Further, the software vulnerability analysis device 100 may be implemented with various kinds of portable devices or computers. Herein, for example, the portable devices are wireless communication devices that ensure portability and mobility and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) device, smart phone, and the like. Further, for example, the computers may include a notebook, a desktop, and a laptop, a tablet PC, and a slate PC equipped with a WEB browser.

The memory 110 illustrated in FIG. 1 may store a program (hereinafter, referred to as "vulnerability analysis program") for conducting vulnerability analysis on any analysis target source codes. The memory 110 stores the vulnerability analysis program therein. Further, the memory 110 may also store various programs in addition to the program. The memory 110 may be implemented with at least one of non-volatile memory such as cache, ROM (Read Only Memory), PROM (Programmable ROM), EPROM (Erasable Programmable ROM), EEPROM (Electrically Erasable Programmable ROM), and flash memory, volatile memory such as RAM (Random Access Memory), or a storage medium such as hard disk drive (HDD) and CD-ROM, but is not limited thereto.

The processor 120 may execute the vulnerability analysis program stored in the memory 110 and detect vulnerabilities from the vulnerability analysis program. While the processor 120 executes the vulnerability analysis program, the communication unit 130 may receive necessary information from the vulnerability database 132 and transfer the information to the processor 120. Further, the communication unit 130 may communicate with external devices and other servers via a network.

The vulnerability database 132 may store source codes of an analysis target, original source code information before the analysis target is patched, patch information, and vulnerability information exploitable in an attack. Herein, the vulnerability database 132 may be an external database server connected to the software vulnerability analysis device 100 as illustrated in FIG. 1, or may be a component of the software vulnerability analysis device 100 unlike the illustration in FIG. 1.

The source codes of the analysis target may be source codes of the analysis target when being stored in the vulnerability database 132. That is, if after the analysis target is patched, the source codes of the analysis target stored in the vulnerability database 132 may be source codes after the patch.

Original source codes of the analysis target refer to original source codes before analysis target source codes are patched. Herein, the original source codes of the analysis target may be stored in the vulnerability database 132 and directly provided to the processor 120 for vulnerability analysis. Further, codes of the analysis target may be extracted from an analysis target source code on the basis of patch history information stored in the vulnerability database 132, and provided to the processor 120 for vulnerability analysis.

The patch information may include patch version information and patch history information. By way of example, the processor 120 may check whether the analysis target source codes are patched by using the patch version information and patch history information. In order to do so, the software vulnerability analysis device 100 may include a separate device configured to extract some information required for vulnerability analysis from the patch information, or a separate program used to extract some information required for vulnerability analysis from the stored patch information may be stored in the memory 110 and used by the processor 120 to extract some information required for vulnerability analysis from the patch information.

The vulnerability information may include already disclosed vulnerability information of the analysis target source codes. By way of example, the vulnerability information may be information used to compress and find a code clone having a vulnerability exploitable in an attack among detected code clones. The vulnerability information may be used as reference data for finding a source code of an input point of a security sink used by the processor 120 for detection of a security sink and sensitive data to be described later.

While the processor 120 searches a code clone, the database 140 may store a code clone searched through a bloom filter. Herein, the database 140 may store various other data required for code clone search in addition to the code clone. Further, the database 140 may be identical to the vulnerability database 132. That is, the database 140 may store the source codes of the analysis target, code information before the analysis target is patched, patch information, and vulnerability information exploitable in an attack, which are stored in the vulnerability database 132.

After the processor 120 generates a result of performing a concolic testing, the display device 150 may display the generated result of the concolic testing on a screen. Therefore, a user can see the concolic testing result (for example, false positive) as a result of code clone search through the display device 150.

Figure 2:
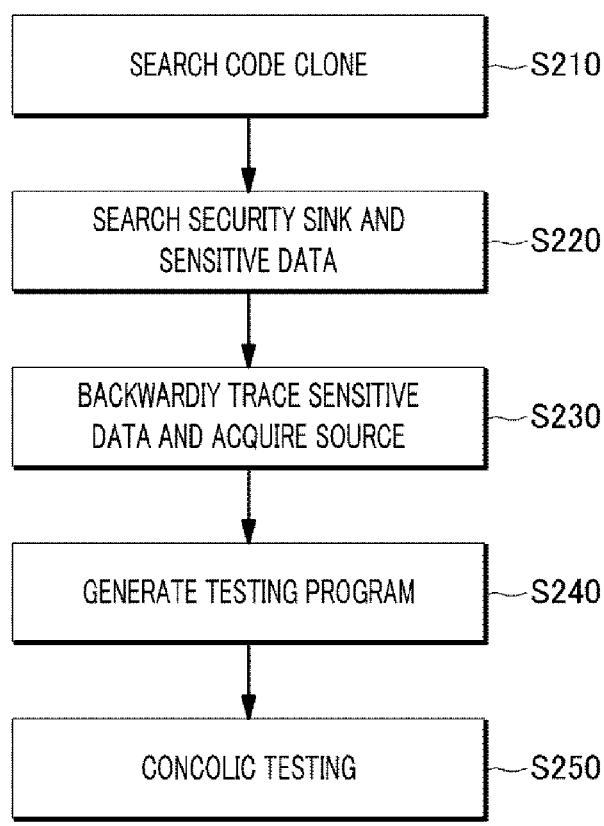
FIG. 2 is a flowchart showing a software vulnerability analysis method of an analysis device.

Hereinafter, a software vulnerability analysis method and the software vulnerability analysis device 100 will be described in detail with reference to FIG. 2 to FIG. 8. FIG. 2 is a flowchart showing a software vulnerability analysis method of the software vulnerability analysis device 100.

The analysis device 100 searches a code clone corresponding to a used source code from analysis target source codes (S210). Then, the analysis device 100 detects a security sink and sensitive data from the searched code clone (S220). The analysis device 100 acquires a source code corresponding to an input point by backwardly tracing the detected sensitive data (S230). The analysis device 100 generates a testing program on the basis of security requirements. Then, the analysis device 100 performs a concolic testing on the basis of the testing program (S250). To be specific, in order to detect a security sink and sensitive data (S210), the analysis device 100 searches a code clone corresponding to a used source code from any analysis target source codes.

In some scenarios, in order to detect a security sink and sensitive data, the analysis device 100 may directly compare analysis target source codes with original source codes of the analysis target source codes. Herein, the analysis target source codes and the original source codes of the analysis target source codes may be stored in the vulnerability database 132.

According to those or other scenarios, in order to detect a security sink and sensitive data, the analysis device 100 may use original source does of an analysis target extracted using analysis target source codes and patch information. Herein, the analysis target source codes and the patch information may be provided from the vulnerability database 132.

Figure 3:
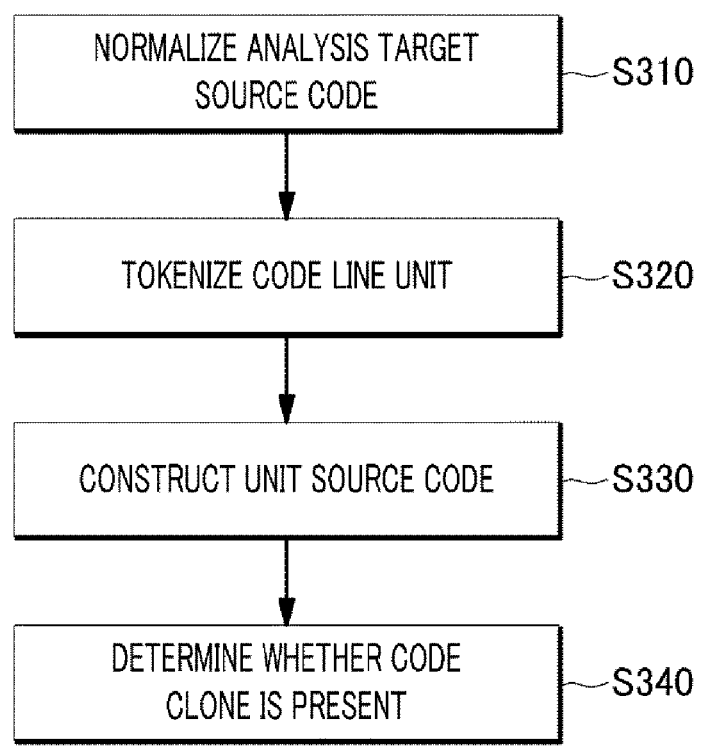
FIG. 3 is a flowchart showing a detailed process of searching a code clone illustrated in FIG. 2.

FIG. 3 is a flowchart showing a detailed process of searching a code clone illustrated in FIG. 2. Referring to FIG. 3 in detail, in order to search a code clone (S210), the analysis device 100 may normalize the analysis target source code and a code of the analysis target (S310), tokenize the normalized source code (S320), construct a unit source code on the basis of the tokenized source code (S330), and determine a code clone using the unit source code (S340).

To be specific, firstly, the analysis device 100 may normalize the analysis target source codes and the original source codes of the analysis target (S310). By way of example, the analysis device 100 may normalize any analysis target source code by removing characters such as non-ASCII characters, redundant whitespaces, lower cases, and braces present in the analysis target source codes or original source codes of the analysis target. Then, the analysis device 100 may tokenize each of the normalized analysis target source codes and normalized original source codes into a line unit of source codes (S310). Then, the analysis device 100 may construct multiple unit source codes by grouping the tokenized analysis target source codes by a predetermined number of lines of source codes in sequence by a window sliding method (S330). By way of example, the analysis device 100 may construct multiple unit source codes by generating n-tokens on the basis of a window including n number of lines (tokens) and performing tokenization by overlapping a predetermined number of lines to slide the window.

Figure 4:
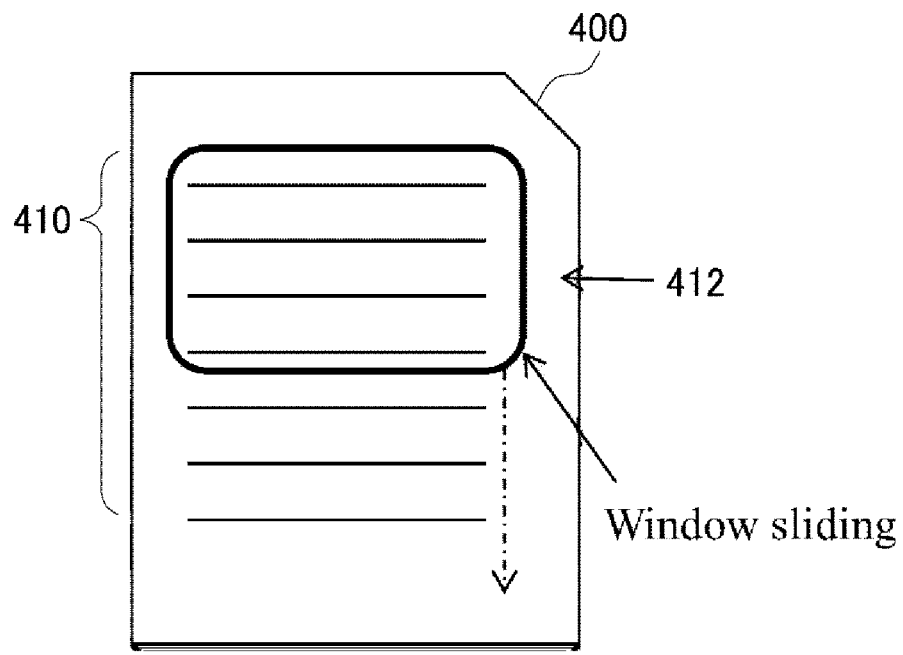
FIG. 4 is a diagram provided to describe a unit source code.

FIG. 4 is a diagram provided to describe a unit source code. Referring to FIG. 4 in detail, the analysis device 100 may set a size of a single window in a tokenized token file 400 to a 4-token including four tokens. Further, the analysis device 100 may generate multiple unit source codes 412 formed of a 4-token by sliding the window while overlapping a previous window with each token.

That is, the analysis device 100 may generate x number of n-token unit source codes 412 by using window sliding including n number of tokens for a single window in a tokenized file $f(t_1, t_2, t_3, \ldots, t_l)$ generated by the tokenization (S320) and including l number of tokens in total. Herein, x, which is the number of the unit source codes 412, may be represented by x=l−n since the total length of the tokenized file is l and a length of the token included in the window is n. That is, the analysis device 100 may extract x number of n-token unit source codes from a file including l number of lines and construct a re-tokenized file $f(u_1, u_2, u_3, \ldots, u_x)$ with x number of unit sources in total.

Then, in order to determine a code clone, the analysis device 100 may determine a predetermined unit source code including the tokenized original source code among the multiple unit source codes as a unit source code including a code clone.

To be specific, the analysis device 100 may remove a line with a prefix "+" from the multiple unit source codes and add a line with a prefix "−" thereto. Further, the analysis device 100 may determine that if the multiple unit source codes from or to which a line is removed or added depending on a prefix are included in the tokenized analysis target original source codes, there is a code clone.

In other words, if a n-token file $f(u_1, u_2, u_3, \ldots, u_x)$ is present in a target source code pool and a predetermined unit source code $f_v$ is present in the n-token file, the analysis device 100 may determine $f_v$ as a code clone. Further, assuming that the unit source code $f_v$ is one of unit source codes corresponding to $S=\{u_1, u_2, u_3, \ldots, u_x\}$, in the case of $S_v \subseteq S$, the analysis device 100 may define that $f_v$ is included in f.

Meanwhile, when comparing a large-scale analysis target source codes with a large-scale original source codes of the analysis target source codes, the analysis device 100 may use a bloom filter in order to quickly search a code clone. In this case, a hash function is generally used in the bloom filter.

The analysis device 100 may apply k number of independent hash functions (for example, $Hash(u_1)$, $Hash(u_2)$, ..., $Hash(u_x)$) with a variable range of [1, m] on the n-token file of the analysis target source codes on the basis of the bloom filter. By way of example, in the case of a hash value $h(x)=i$, the analysis device 100 may set the $i^{th}$ hashed bit value of a hashed bit vector to 1.

To detect a membership in the bloom filter, the analysis device 100 may apply k number of independent hash functions on a n-token data set. By way of example, the analysis device 100 may apply k number of hash functions on n-tokens from $f_v$.

Through the above-described process, the analysis device 100 may check whether all of bits relevant to a unit source code in the bloom filter are set to 1. In this case, if at least one of the hashed bits is 0, the analysis device 100 may determine that a code clone is not present.

The analysis device 100 determines whether a code clone is present in a unit source code (S340), ends the search for the code clone (S210), and searches a security sink and sensitive data (S220).

In order to search the security sink and the sensitive data (S220), the analysis device 100 may detect a security sink and all sensitive data relevant to the security sink on the basis of patch information within the searched code clone.

Herein, vulnerability information may be information received by the communication unit 130 of the analysis device 100 from the vulnerability database 132. Further, the vulnerability information may include at least one of a source code already used for an attack of an attacker and a source code expected to be used for an attack of an attacker, and may be referred to for detecting the security sink and the sensitive data. In this case, the source code may include, for example, a function argument and function data.

Herein, the security sink may be a point where a function argument, which can be potentially used in a dangerous manner, is located in any analysis target source code. Further, the sensitive data refer to all relevant source code blocks including the security sink or all function arguments constituting the all relevant source code blocks.

By way of example, the security sink and the sensitive data may include function arguments and function data which can be used for memory copy, memory allocation, format string, and arithmetic operation.

To be specific, the security sink may be a point where a function argument used for memory copy is located in analysis target source codes. By way of example, a function used for memory copy may include strcpy and memcpy. This sensitive sink may cause serous security problems such as a buffer overflow when a relevant source code block (sensitive data) including the sensitive sink is maliciously used by an attacker.

Further, the security sink may be a point where a function argument used for memory allocation is located in analysis target source codes. By way of example, a function used for memory copy may include malloc and alloca. This sensitive sink may cause problems such as insufficient memory of a system when a source code block (sensitive data) including the point where the function argument for memory allocation is located is maliciously used by an attacker.

Furthermore, the security sink may be a point where a function argument used for format string is located in analysis target source codes. By way of example, a function used for format string may include printf and scanf. This sensitive sink may cause system control problems when a source code block (sensitive data) including the sensitive sink is maliciously used by an attacker.

Moreover, the security sink may be a point where a function argument used for arithmetic operation is located in analysis target source codes. By way of example, an argument used for arithmetic operation may an integer. This sensitive sink may cause integer overflow, integer underflow, or zero problems when a source code block (sensitive data) including the sensitive sink is maliciously used by an attacker.

In other words, in order to search the security sink and the sensitive data (S220), the analysis device 100 may detect a point (security sink) where a scour code function argument, which can be maliciously used by an attacker, is located and a source code block (sensitive data) including the function argument which can be maliciously used by an attacker.

Then, the analysis device 100 acquires a source (final function source) corresponding to an input point by backwardly tracing the sensitive data detected in the analysis target source code (S230).

A process for backward tracing sensitive data and acquiring a source code by the analysis device 100 will be described in detail with reference to FIG. 5 to FIG. 7.

Figure 5:
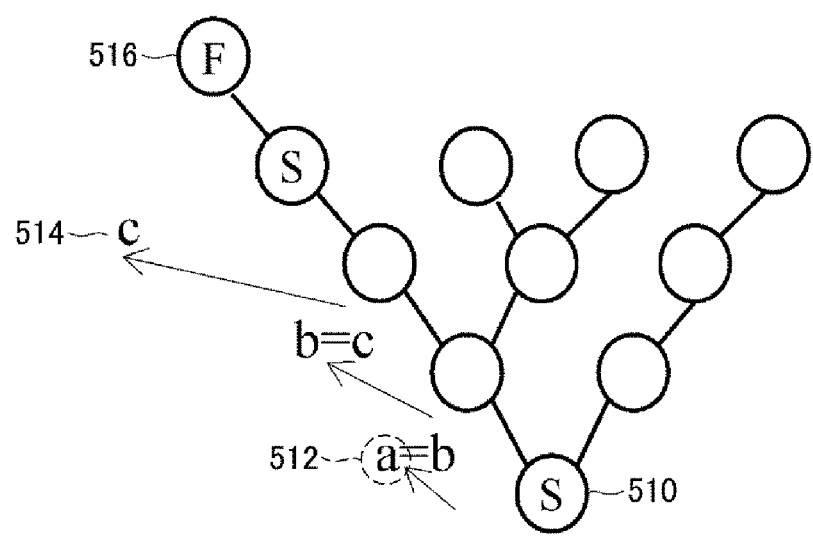
FIG. 5 is a diagram provided to describe a backward tracing of a security sink and sensitive data.

FIG. 5 is a diagram provided to describe a backward tracing of a security sink and sensitive data. Referring to FIG. 5, the analysis device 100 may backwards trace an input point of a security sink by performing a backward tracing from a security sink "a" 510. By way of example, the analysis device 100 may backwards trace a source code 516 corresponding to an input point "c" from the security sink "a" by performing a backward tracing of sensitive data "a" 510→"b" 514→"c" 514 in sequence.

The input point 516 may be a starting point of a final function relevant to the security sink and the sensitive data of the analysis target source code. Herein, the analysis device 100 may perform a backward tracing of the detected sensitive data by using a code structure graph (CSG) in order to acquire a source code corresponding to the input point 516. The analysis device 100 may precedently define information about a source code execution sequence and information about parallel code blocks which are equivalent to each other but cannot be executed at the same time.

Figure 6B:
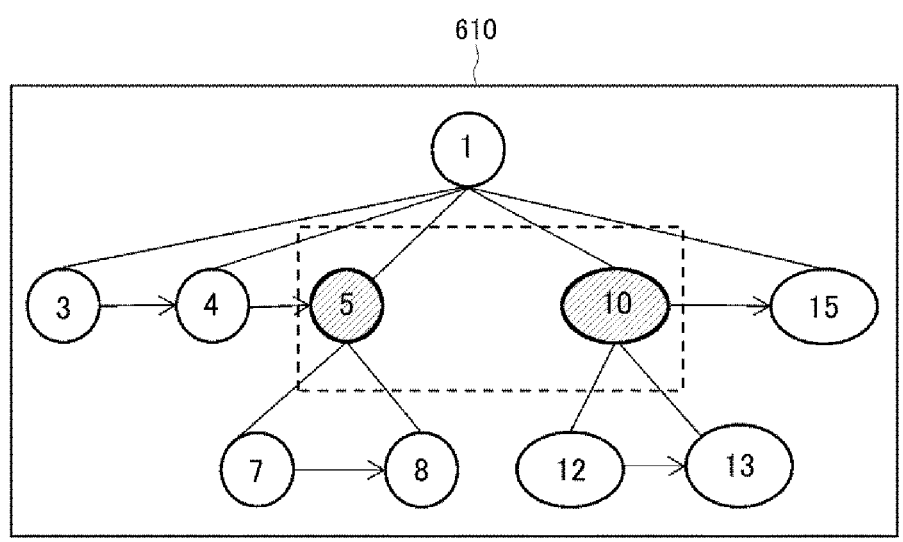

FIG. 6A and FIG. 6B are diagrams provided to describe a code structure graph. A sequence of executing a source code in any source code block 600 illustrated in FIG. 6A can be seen from a code structure graph 610 illustrated in FIG. 6B. As shown in FIG. 6B, depend on the execution sequence of the source code 600 along a line No. for the source code illustrated in FIG. 6A, it can be seen that a first path is from "1"→"3"→"4"→"5"→"7" to "8" in sequence, a second path is from "1"→"10"→"12"→"13" to "15". Further, a line No. "5" and a line No. "10" may be parallel code blocks which cannot be executed at the same time. Therefore, a sequence of a backward tracing may be from "15"→"13"→"12"→"8"→"7"→"4"→"3" to "1".

Figure 7A:
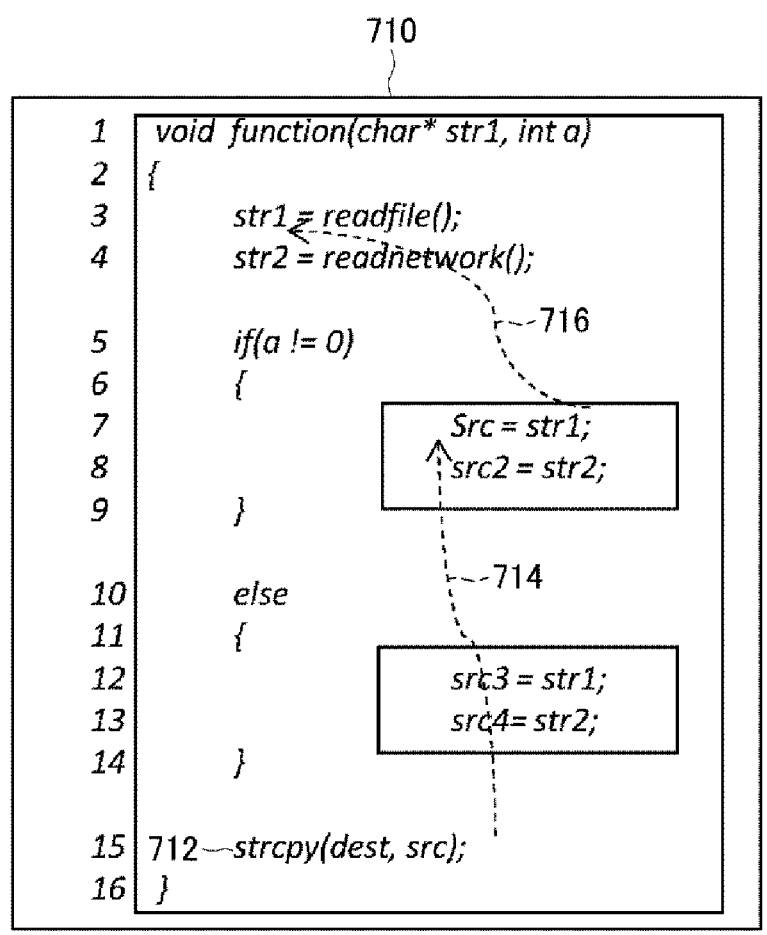

FIG. 7A and FIG. 7B are diagrams provided to describe an execution process of the code structure graph illustrated in FIG. 6B. Referring to FIG. 7A in detail, an analysis target source code 710 shows a process for detecting an input point by performing a backward tracing of a source code block 714 including a high-level parameter relevant to a target to be actually copied in a source code and a source code block 716 including a second high-level parameter, from a security sink 712 using a string copy function argument.

Depend on a backward tracing code 720 performing such a backward tracing in FIG. 7B, the backward tracing code 720 uses a recursive function using a variable V indicative of a security sink and sensitive data and a code structure graph variable G. Further, the backward tracing code 720 repeatedly performs a process for finding a path (significant statement) for finding a source code of a final input point through a while loop.

Meanwhile, the analysis device 100 may generate a testing program for the path from the input point obtained through the process for backward tracing sensitive data and acquiring a source code (S230) and perform a concolic testing. In other words, the analysis device 100 performs a concolic testing on the basis of a path from an input point to a security sink and verifies whether a code clone searched by the concolic testing is included in a vulnerability in an analysis target source code.

In other words, the analysis device 100 may generate a testing program on the basis of a path expression of a source code path from the input point obtained by backwardly tracing the security sink and sensitive data in the detected code clone. Further, the analysis device 100 performs a concolic testing to the generated testing program through a dynamic testing in which a random initial input value is applied to each path.

By way of example, the analysis device 100 may extract a path from a security sink to a source code of an input point by inserting a probe. Herein, the path from the security sink to the input point may be a symbolic path formula. The symbolic path formula extracted as such enables determination whether a corresponding vulnerability is a vulnerability actually exploitable in an attack or a simple bug which causes a crash of a program.

Herein, the analysis device 100 may acquire a result of the concolic testing depend on a dynamic testing in which any initial value is input to the input point.

Further, the analysis device 100 may determine whether the result of the concolic testing satisfies a predefined security requirement to operate a statement of an analysis target source code as a significant operation command.

The security requirement may be relevant to at least one of predetermined security-sensitive function parameters, memory access, and integer arithmetic.

Herein, the security requirement may mean a condition which should be satisfied in a normal source code without a vulnerability. Therefore, the analysis device 100 may use the security requirement as a condition to determine whether the analysis target source code has a vulnerability.

FIG. 8 is a diagram provided to describe security requirements for generating a testing program. Referring to FIG. 8 in detail, requirements for the respective function parameters are shown.

By way of example, a security requirement for string copy functions (strcpy) 801 and (strncpy) 802 may be that a length of a string to be copied does not exceed a capacity of a buffer. A security requirement for a string manipulation function (strcat) 803 may be that a length of a string to be manipulated does not exceed a capacity of a buffer. A security requirement for a string output function (printf) 804 may be that a difference between the number of formats for a string and the number of parameters for a string format is uniformly 1.

The vulnerability analysis method and analysis device 100 described above make it possible to efficiently conduct vulnerability analysis high reliability.

Depend on any one of the above-described exemplary scenarios of the present disclosure, the vulnerability analysis method and analysis device 100 may search a code clone corresponding to a reused source code from a large-scale analysis target source codes and use the searched code clone for vulnerability analysis. Thus, the vulnerability analysis method and analysis device 100 can increase efficiency and rapidity in analyzing vulnerabilities of the large-scale analysis target source code.

Further, the vulnerability analysis method and analysis device 100 may perform a backward tracing of a program path on the basis of a security sink and sensitive data by using a code structure graph in order to acquire a source code corresponding to an input point which can be used by an attack. Thus, the vulnerability analysis method and analysis device 100 can increase efficiency and accuracy in acquiring the source code corresponding to the input point.

Furthermore, the vulnerability analysis method and analysis device 100 may perform a concolic testing to the acquired input point source code to verify whether there is a vulnerability on the basis of security requirements. Thus, the vulnerability analysis method and analysis device 100 can determine whether the input point source code is actually exploitable in an attack with high reliability.

Hereinafter, the analysis device 100 will be described more specifically with reference to an exemplary implemented configuration. However, it can be easily understood that the present disclosure is not limited thereto.

Figure 9:
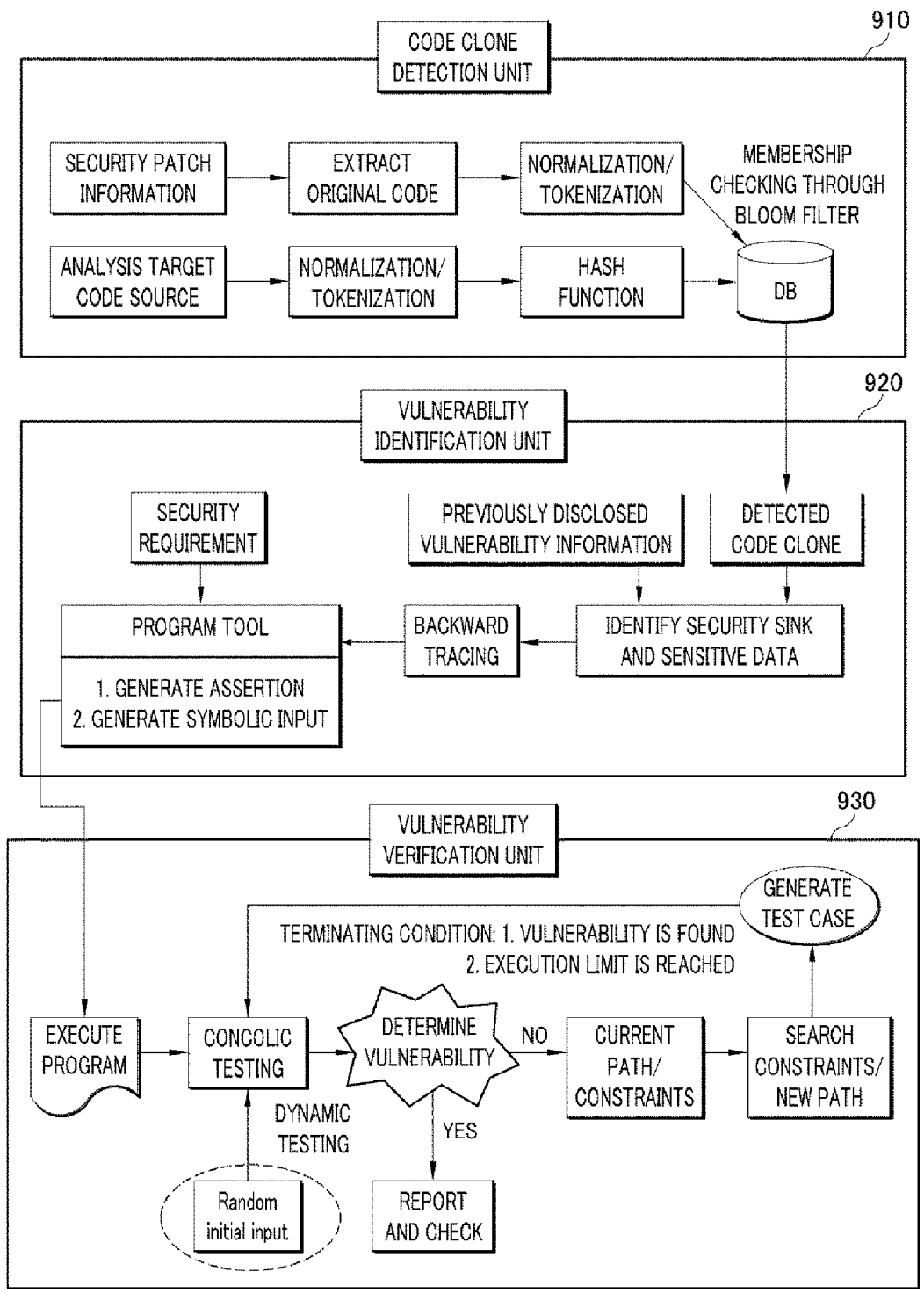
FIG. 9 is a diagram illustrating a whole process of the software vulnerability analysis method proposed in the present disclosure.

FIG. 9 is a diagram illustrating a whole process of the software vulnerability analysis method proposed in the present disclosure. The software vulnerability analysis device 100 may be implemented by the vulnerability analysis method as including a code clone detection unit 910, a vulnerability identification unit 920, and a vulnerability verification unit 930.

The code clone detection unit 910 may detect a code clone by comparing a source code of an analysis target with an original source code of the analysis target. The original source code used herein may be directly provided from the vulnerability database 132 or extracted using patch information provided from the vulnerability database 132.

Before detecting the code clone, the code clone detection unit 910 may perform a series of a normalization process and a tokenization process to each of the source code of the analysis target and the original source code of the analysis target.

The code clone detection unit 910 may reconstruct the normalized and tokenized source code of the analysis target into a hash function. Further, the code clone detection unit 910 may perform membership checking to the normalized and tokenized original source code through a bloom filter. Herein, the detected code clone may be stored in the separate database 140.

The vulnerability identification unit 920 may perform a backward tracing by using vulnerability information stored in the vulnerability database 132 and provided to the analysis device 100 from the code clone detected by the code clone detection unit 910. Further, the vulnerability identification unit 920 may acquire a source code corresponding to an input point on the basis of a security sink and sensitive data by performing the backward tracing.

Herein, the vulnerability identification unit 920 may backwards trace sensitive data detected by using a code structure graph. Further, the vulnerability identification unit 920 may acquire a path and sensitive data with respect to an input point obtained by performing the backward tracing.

The vulnerability verification unit 930 may verify whether the input point acquired by the vulnerability identification unit 920 is actually vulnerable. That is, the vulnerability verification unit 930 may perform a concolic testing to a path from the input point to the security sink and perform a dynamic testing applied with a random initial input. Herein, a security requirement may be used as a condition to determine whether there is a vulnerability.

As a result of the testing to the input point acquired by the vulnerability identification unit 920, if it is determined that the input point has a vulnerability, the vulnerability verification unit 930 may report the vulnerability of the input point to a user through the display device 150 in the software vulnerability analysis device 100. By way of example, the information reported to the user through the display device 150 may include used patch information, a list of detected code clones, the number of detected code clones, paths of detected code clones, and a false positive rate as a result of the concolic testing.

As a result of the testing to the input point, if it is determined that there is no vulnerability, the vulnerability verification unit 930 may repeat the testing until a terminating condition is satisfied. Herein, the terminating condition may include when a vulnerability is found from the input point or when a threshold determined by the user is reached. After the terminating condition is satisfied, if it is determined that the input point to which the testing is performed does not have a vulnerability, the vulnerability verification unit 930 may perform the testing to an input point determined as being next vulnerable.

FIG. 10A to FIG. 10D are diagrams provided to describe a result of vulnerability analysis depend on the software vulnerability analysis method proposed in the present disclosure. That is, FIG. 10A to FIG. 10D show types of information provided to a user through a display device in a software vulnerability analysis device.

FIG. 10A is a diagram showing a detection result of a code clone. From FIG. 10A, the user can see a program list ('target') to which vulnerability analysis is conducted, a patch list ('CVE patches') used for vulnerability detection, an analysis target source code pool ('target scr pool'), the number of files analyzed for vulnerability detection ('number of files'), the number of detected code clones ('number of reported code clones'), and time taken to detect a code clone ('execution time').

By way of example, detection result information may be provided in the form as shown in FIG. 10B to the display device 150. Referring to FIG. 10B in detail, there is provided information about vulnerabilities actually exploitable in an attack among 63 code clones in 'Scr pool-1', which is a source code pool, from the program list to which vulnerability analysis is conducted. Further, information about each program list, a CVE patch in patch list of the program list, and a path in which each vulnerability is found can be seen from FIG. 10B.

FIG. 10C and FIG. 10D are diagrams illustrating a result of a concolic testing applied with a backward tracing program and a dynamic testing. From FIG. 10C and FIG. 10D, the user can see a result of the concolic testing to a source code list of the analysis target to which vulnerability analysis is conducted. The user may check a false positive rate depend on whether the actually detected code clone actually has a vulnerability on the basis of the information provided herein.

The software vulnerability analysis method and analysis device 100 may search a code clone corresponding to a used source code from a large-scale analysis target source codes and use the searched code clone for vulnerability analysis. Thus, the vulnerability analysis method and analysis device 100 can increase efficiency and rapidity in analyzing vulnerabilities of the large-scale target source code.

Further, the software vulnerability analysis method and analysis device 100 may perform a backward tracing of a program path on the basis of a security sink and sensitive data by using a code structure graph in order to acquire a source code corresponding to an input point which can be used by an attack. Thus, the software vulnerability analysis method and analysis device 100 can increase efficiency and accuracy in acquiring the source code which is from the user input point to the security sink.

Furthermore, the software vulnerability analysis method and analysis device 100 may perform a concolic testing to the acquired input point which is from the user input point to the security sink to verify whether there is a vulnerability on the basis of security requirements. Thus, the software vulnerability analysis method and analysis device 100 can determine whether the acquired source code is actually exploitable in an attack with high reliability. Therefore, as compared with the conventional static analysis methods, the software vulnerability analysis method and analysis device 100 can reduce false positives. Further, the software vulnerability analysis method and analysis device 100 can remove the restriction that the conventional concolic testing methods can be applied only to small-scale codes.

The software vulnerability analysis method and analysis device 100 can be implemented in a storage medium including instruction codes executable by a computer or processor such as a program module executed by the computer or processor. A data structure in accordance with the illustrative configurations can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A software vulnerability analysis method in an analysis device, comprising:
    searching a code clone corresponding to a used source code from any analysis target source code;
    detecting a security sink and sensitive data of the security sink on the basis of patch information in the searched code clone after the searching;
    acquiring a source code which is from a user input point to the security sink by backwardly tracing the sensitive data detected in the analysis target source code after the detecting; and
    verifying whether the searched code clone is a vulnerability in the analysis target source code by performing a concolic testing on the basis of a path from the user input point to the security sink after the acquiring a source code;
    wherein the searching a code clone comprises:
        normalizing each of the analysis target source code and an original source code of the analysis target source code;
        tokenizing the normalized analysis target source code and the normalized original source code into source code lines, respectively;
        constructing multiple unit source codes by grouping the tokenized analysis target source code by a predetermined number of lines of source codes in sequence after the tokenizing; and
        determining a predetermined unit source code including the tokenized original source code among the multiple unit source codes as a unit source code including the code clone after the constructing multiple unit source codes.

2. The software vulnerability analysis method of claim 1, wherein the determining is performed using a bloom filter.

3. The software vulnerability analysis method of claim 1, wherein the searching is performed by comparing the analysis target source code with an original source code of the analysis target source code.

4. The software vulnerability analysis method of claim 1, wherein the searching is performed using the patch information.

5. The software vulnerability analysis method of claim 1, wherein the acquiring a source code is performed by backwardly tracing the detected sensitive data on the basis of a code structure graph.

6. The software vulnerability analysis method of claim 1, wherein the verifying comprises:
    acquiring a result of the concolic testing by inputting any initial value to the input point; and
    determining whether the result of the concolic testing acquired in the acquiring a result of the concolic testing satisfies a predefined security requirement to operate a statement of the analysis target source code as a significant operation command.

7. The software vulnerability analysis method of claim 6, wherein the security requirement is relevant to at least one of predetermined function parameters, memory access, and integer arithmetic.

8. A software vulnerability analysis device comprising: a memory in which a program for conducting vulnerability analysis on any analysis target source code is stored; and a processor configured to execute the program, wherein when the program is executed, the processor searches a code clone corresponding to a used source code from the analysis target source code, detects a security sink and sensitive data of the security sink on the basis of patch information in the searched code clone, acquires a source code which is from a user input point to the security sink by backwardly tracing the sensitive data detected in the analysis target source code, and verifies whether the searched code clone is a vulnerability in the analysis target source code by performing a concolic testing on the basis of a path from the user input point to the security sink; wherein the processor searches the code clone by normalizing each of the analysis target source code and an original source code of the analysis target source code, tokenizing the normalized analysis target source code and the normalized original source code into source code lines, respectively, constructing multiple unit source codes by grouping the tokenized analysis target source code by a predetermined number of lines of source codes in sequence after the tokenizing; and determining a predetermined unit source code including the tokenized original source code among the multiple unit source codes as a unit source code including the code clone after the constructing multiple unit source codes.

9. The software vulnerability analysis device of claim 8, wherein the processor searches the code clone using a bloom filter.

10. The software vulnerability analysis device of claim 8, further comprising:
    a display device,
    wherein the processor displays a result of verifying whether the searched code clone is a vulnerability on the display device.

* * * * *